(12) United States Patent
Agrinier

(10) Patent No.: US 11,186,156 B2
(45) Date of Patent: Nov. 30, 2021

(54) MONOBLOC DEVICE FOR SUPPORTING A POWERPLANT, INCORPORATING A CONNECTING-SHAFT BEARING

(71) Applicant: NISSAN MOTOR CO., LTD., Yokohama (JP)

(72) Inventor: Jean-Luc Agrinier, Clamart (FR)

(73) Assignee: NISSAN MOTOR CO., LTD., Yokohama (JP)

( * ) Notice: Subject to any disclaimer, the term of this patent is extended or adjusted under 35 U.S.C. 154(b) by 57 days.

(21) Appl. No.: 16/629,705

(22) PCT Filed: Jun. 14, 2018

(86) PCT No.: PCT/FR2018/051401
§ 371 (c)(1),
(2) Date: Jan. 9, 2020

(87) PCT Pub. No.: WO2019/012194
PCT Pub. Date: Jan. 17, 2019

(65) Prior Publication Data
US 2021/0078396 A1    Mar. 18, 2021

(30) Foreign Application Priority Data

Jul. 10, 2017 (FR) ...................................... 1756487

(51) Int. Cl.
*B60K 1/00*    (2006.01)
*B60K 5/12*    (2006.01)
(Continued)

(52) U.S. Cl.
CPC .................. *B60K 1/00* (2013.01); *B60K 5/12* (2013.01); *B60K 5/1208* (2013.01); *B60K 17/24* (2013.01);
(Continued)

(58) Field of Classification Search
CPC .......... B60K 1/00; B60K 5/1208; B60K 5/12; B60K 17/24; B60K 2001/001; B60Y 2200/91; F16C 35/00
See application file for complete search history.

(56) References Cited

U.S. PATENT DOCUMENTS 4,403,762 A * 9/1983 Cogswell, II ........... F16F 7/108
188/379
4,456,213 A * 6/1984 Fukushima ............. F16F 7/108
248/559
(Continued)

FOREIGN PATENT DOCUMENTS

FR   2 742 705 A1   6/1997
FR   2 890 739 A1   3/2007
(Continued)

*Primary Examiner* — Erez Gurari
(74) *Attorney, Agent, or Firm* — Foley & Lardner LLP

(57) ABSTRACT

A monobloc device (40) for supporting a motor vehicle powerplant (10) comprising: a support arm (42), a fastening mount (44) that is arranged at a first end of the support arm (42) and that is designed to be rigidly attached to the powerplant (10), and a suspension ring (48) with a given main axis (A) that is arranged at a second end of the support arm (42) and that is designed to be attached to a structural element (38) of the vehicle with an interposed damping ring (50), characterized in that the support arm (42) comprises a connecting-shaft bearing (52) through which a transmission shaft (22) of the powerplant (10) is intended to pass intended to support the shaft.

7 Claims, 4 Drawing Sheets

Figure 1:
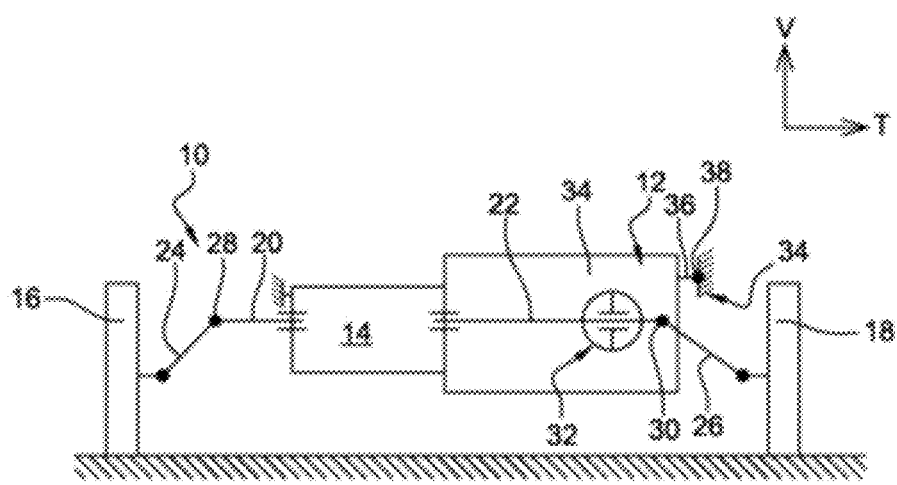

(51) Int. Cl.
*B60K 17/24* (2006.01)
*F16C 35/00* (2006.01)

(52) U.S. Cl.
CPC ..... *B60K 2001/001* (2013.01); *B60Y 2200/91* (2013.01); *F16C 35/00* (2013.01)

(56) References Cited

U.S. PATENT DOCUMENTS

| | | | | |
|---|---|---|---|---|
| 5,037,058 | A * | 8/1991 | Kojima | F16F 9/12 |
| | | | | 248/562 |
| 5,078,230 | A * | 1/1992 | Hasuike | B60K 5/04 |
| | | | | 180/291 |
| 5,103,943 | A * | 4/1992 | Ide | B60K 5/1208 |
| | | | | 188/306 |
| 8,215,444 | B2 * | 7/2012 | Fsadni | F16H 57/025 |
| | | | | 180/300 |
| 9,623,909 | B1 * | 4/2017 | Hirano | B60K 5/1216 |
| 10,518,620 | B2 * | 12/2019 | Yamafuji | B60L 3/0007 |
| 10,981,441 | B2 * | 4/2021 | Tanaka | B60K 5/1208 |
| 2002/0096384 | A1 * | 7/2002 | Yoshida | B62D 21/152 |
| | | | | 180/298 |
| 2004/0154851 | A1 | 8/2004 | Massicotte et al. | |
| 2004/0245037 | A1 * | 12/2004 | Aoyama | B66F 9/07595 |
| | | | | 180/312 |
| 2007/0000713 | A1 * | 1/2007 | Mir | B60K 17/00 |
| | | | | 180/300 |
| 2007/0051549 | A1 * | 3/2007 | Fukuda | B60L 50/66 |
| | | | | 180/232 |
| 2011/0308877 | A1 * | 12/2011 | Hiruma | B60K 5/12 |
| | | | | 180/299 |
| 2014/0015177 | A1 * | 1/2014 | Yoneyama | B60K 5/1241 |
| | | | | 267/141.1 |
| 2014/0367547 | A1 * | 12/2014 | Ohnishi | F16F 1/3849 |
| | | | | 248/638 |
| 2016/0193907 | A1 * | 7/2016 | Satou | B60K 5/1208 |
| | | | | 267/140.4 |
| 2016/0243935 | A1 * | 8/2016 | Yun | B60K 17/24 |
| 2016/0297290 | A1 * | 10/2016 | Murata | B60L 58/30 |
| 2018/0058537 | A1 * | 3/2018 | Yanagida | F16F 15/022 |
| 2019/0047396 | A1 * | 2/2019 | Gallagher | B60K 5/1208 |
| 2019/0346001 | A1 * | 11/2019 | Tanaka | F16F 1/3849 |
| 2020/0072315 | A1 * | 3/2020 | Seno | B60K 5/1291 |
| 2020/0292026 | A1 * | 9/2020 | Kim | F16F 13/08 |
| 2021/0078396 | A1 * | 3/2021 | Agrinier | B60K 1/00 |

FOREIGN PATENT DOCUMENTS

| | | |
|---|---|---|
| FR | 2 927 278 A1 | 8/2009 |
| FR | 2 927 280 A1 | 8/2009 |
| FR | 2 946 715 A1 | 12/2010 |
| WO | WO-2011/121785 A1 | 10/2011 |

* cited by examiner

MONOBLOC DEVICE FOR SUPPORTING A POWERPLANT, INCORPORATING A CONNECTING-SHAFT BEARING

TECHNICAL FIELD OF THE INVENTION

The invention relates to a monobloc device for supporting a motor vehicle powerplant.

TECHNICAL BACKGROUND TO THE INVENTION

A motor vehicle powerplant usually comprises a motor, a gearbox and/or a gear motor and at least one transmission shaft coming from said gearbox or gear motor. It is known to arrange the powerplant axially, i.e. with the crankshaft oriented longitudinally in the direction of movement of the vehicle, or transversely, i.e. with the crankshaft oriented perpendicular to the direction of movement of the vehicle.

Where the power plant is arranged transversely, the gearbox or the gear motor is arranged transversely on one side of the motor. The powertrain drives the right- and left-hand wheels of the vehicle by means of two transverse transmission shafts of different lengths. A short transmission shaft links a differential built into the gearbox to one wheel and a long transmission shaft, which extends partially beneath the motor of the vehicle, links the differential to the other wheel.

This long transmission shaft raises several problems of flexion and torsion during operation of the powerplant. The long transmission shaft is subject to numerous vibrations.

To overcome this drawback, it is known to support and guide The long transmission shaft in rotation using a bearing referred to as a "connecting-shaft bearing", which is attached to the powerplant. This layout enables absorption of the flexion forces of the long transmission shaft on the powerplant, thereby improving performance and reliability of the long transmission shaft.

Furthermore, it is known to attach the power plant to structural elements of the motor-vehicle by means of motor supports. motor supports are very rigid parts that are attached to the structural elements by means of damping members such as rings made of elastomer materials also known as rubber bushings. Thus, the motor is carried by the structure of the vehicle with damping that notably helps to prevent the vibrations caused by operation of the motor from being transmitted to the structure of the vehicle.

Nowadays, vehicles usually have a small motor compartment that has to contain more and more accessories. It is common for motor vehicle designers to encounter overcrowding problems that prevent all of the parts of the motor from being arranged freely.

Accordingly, in some motors, the transmission shaft passes exactly through the location that should be occupied by a support of the motor.

SHORT SUMMARY OF THE INVENTION

The invention relates to a monobloc device for supporting a motor vehicle powerplant comprising:
a support arm,
a fastening mount that is arranged at a first end of the support arm and that is designed to be rigidly attached to the powerplant, and
a suspension ring with a given main axis that is arranged at a second end of the support arm and that is designed to be attached to a structural element of the vehicle with an interposed damping ring,
characterized in that the support arm includes a connecting-shaft bearing that is designed to support a transmission shaft of the powerplant passing therethrough.

According to other features of the invention:
the connecting-shaft bearing is formed in an intermediate section of the arm positioned between the mount and the suspension ring,
the connecting-shaft bearing is arranged closer to the mount than to the suspension ring,
the connecting-shaft bearing is formed by an orifice delimited by a closed annular wall with a given main axis,
the connecting-shaft bearing is designed to be closed by an attached cap,
the main axis of the suspension ring is parallel with the main axis of the connecting-shaft bearing,
the arm has stiffening ribs in a plane orthogonal to the axis of the suspension ring that link the intermediate section and the fastening mount.

The invention also relates to a motor vehicle fitted with a powerplant including an electric motor, characterized in that the powerplant is attached to a structural element of the vehicle by at least one support device designed according to the teachings of the invention.

SHORT DESCRIPTION OF THE FIGURES

Figure 2:
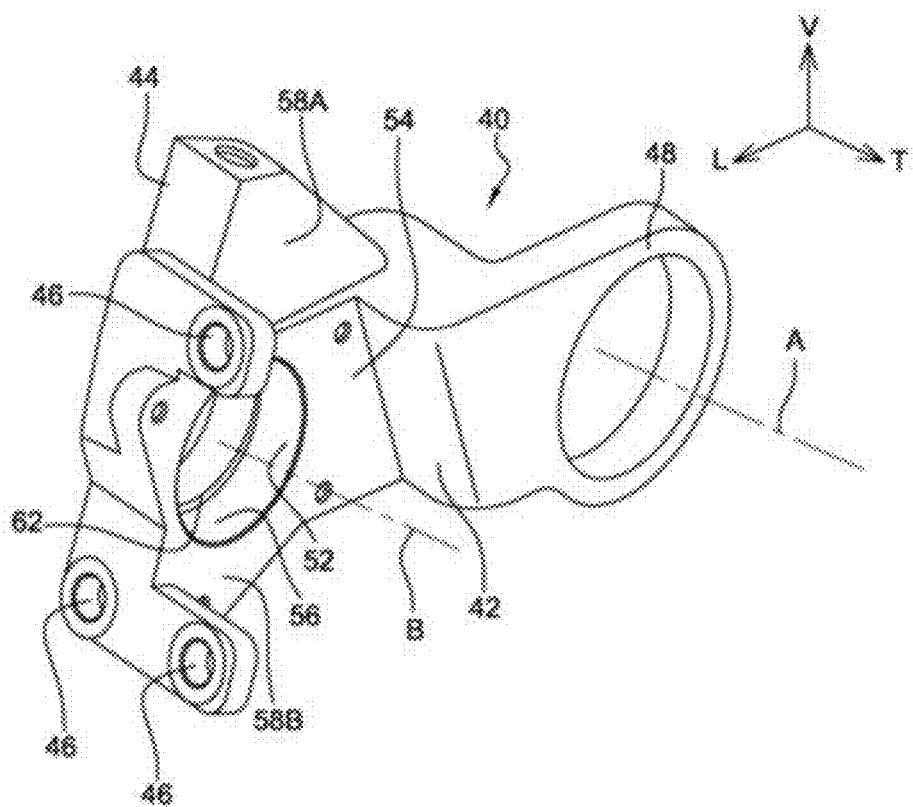
Figure 3:
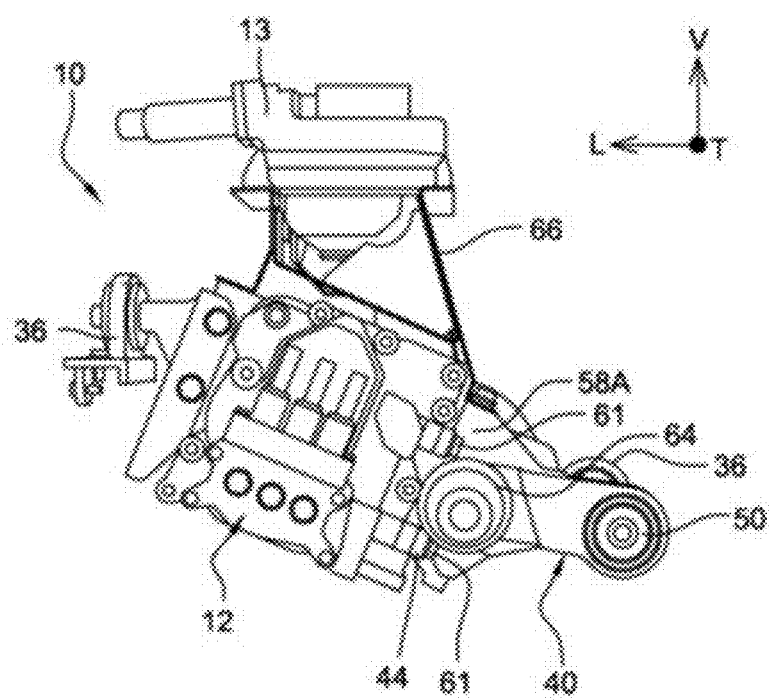
Figure 4:
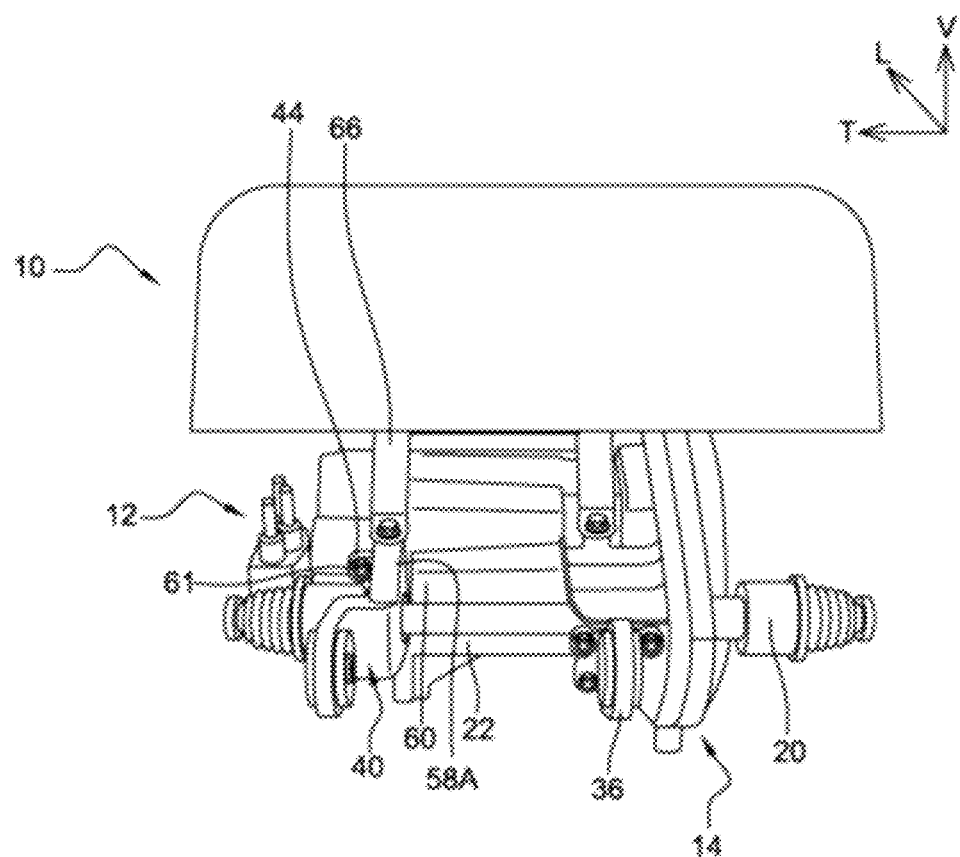

Other features and advantages of the invention are given in the detailed description below, provided with reference to the attached drawings, in which:

FIG. 1 is a schematic view of a powerplant made according to the teachings of the invention, FIG. 2 is a perspective view of a support device for the powerplant incorporating a connecting-shaft bearing made according to the teachings of the invention, FIG. 3 is a side view of the powerplant fitted with the support device in FIG. 2, FIG. 4 is a front view of the powerplant in FIG. 3.

DETAILED DESCRIPTION OF THE FIGURES

The following non-limiting orientations are used in the remainder of the description:
longitudinal "L", oriented from back to front in the normal direction of movement of the vehicle,
transversal "T", oriented from left to right,
vertical "V", oriented from bottom to top.

In the remainder of the description, elements that have the same structure or similar functions are referred to using the same reference signs.

FIG. 1 shows a transverse powerplant 10 for a motor vehicle (not shown).

In the embodiment shown in FIGS. 3 and 4, this is a powerplant 10 comprising an electric traction motor 12, a gearbox 14 fitted with a differential and a charger 15.

The term "gearbox" also encompasses a gear motor without transmission ratio changes.

In a known manner, the powerplant 10 comprises at least the motor 12 that is coupled to the gearbox 14. The gearbox 14 is able to drive two wheels 16 and 18 of the vehicle by means of a short transmission shaft 20 and a long transmission shaft 22 that extends partially beneath the motor 12.

Each transmission shaft 20, 22 is driven by the gearbox 14. Each transmission shaft 20, 22 drives the associated wheel 16, 18 by means of an axle shaft 24, 26. The transmission shafts 20, 22 are linked in rotation to the axle shafts 24, 26 by means of a respective constant velocity joint 28, 30.

In a known manner, the long transmission shaft 22 is guided in rotation by a connecting-shaft bearing 32 that is attached to a wall of an element of the powerplant 10, for example to a wall of a block 34 of the motor 12.

Furthermore, the powerplant 10 is formed by an assembly of modules, in this case the motor 12, the inverter 13 and the gearbox 14, which are rigidly connected to one another. Thus, the powerplant 10 forms a single assembly that can be carried by a block. In a known manner and as shown in FIG. 1, the powerplant 10 is usually supported by at least one structural element 34 of the motor vehicle, for example by a cradle, by means of a plurality of rigid support devices 36. A first end of the rigid support 36 is attached to the powerplant 10 and the opposite end is attached to a suspension contact (not shown) of the support element 36 by means of a damping member 38, usually a ring made of an elastomer material, also known as a rubber bushing. Thus, at least some of the vibrations generated by the powerplant 10 are not transmitted to the structural element 34. Each support element 36 must be rigid and strong enough to carry some of the weight of the powerplant 10 despite the vibrations.

The powerplant 10 is in this case arranged so that the long transmission shaft 22 is arranged longitudinally opposite a suspension contact of the structural element 36. This makes it difficult to arrange a support device 36 on the wall facing the powerplant without hindering passage of the long transmission shaft 22.

To overcome this problem, the invention proposes the support device 40, which is illustrated in FIGS. 2 to 4.

As shown in particular in FIG. 2, the support device 40 comprises a support arm 42 that extends in this case in a longitudinal direction from a rear end to a front end. In this case, the transverse width of the support arm 42 is less than the vertical height thereof.

The support device 40 also includes a fastening mount 44 that is arranged at a first end of the support arm 42, in this case the front end. The fastening mount 44 is a transverse vertical plate in which a face opposite the arm 42 is designed to be pressed longitudinally against an associated face of the powerplant 10, as explained in greater detail below.

The mount 44 is designed to be rigidly attached to the powerplant 10. For this purpose, the mount 44 is in this case perforated by several attachment orifices 46, in this case three, that are designed to receive a threaded stem, for example of a screw or a stud.

A suspension ring 48 with a main transverse axis "A" is arranged at a second end, in this case the rear end, of the support arm 42. The ring is designed to be coupled to a suspension contact (not shown) of the structural element with an interposed damping member 50, in this case a ring made of the elastomer material. The support device 40 is thus designed to be attached to the structural element of the vehicle by fitting the ring 48 on the associated suspension contact.

As explained above, the support device 40 is monobloc. This means that the arm 42, the mount 44 and the ring 48 are made as a single part. The device is in this case made as a single part by molding and machining said part. The support device 40 is for example made of a metal material such as steel, cast iron or aluminum.

Furthermore, the support arm 42 includes a connecting-shaft bearing 52 that is designed to support the long transmission shaft 22 passing therethrough. The connecting-shaft bearing 52 is designed to seat a guide bearing (not shown) for the long transmission shaft 22 of the powerplant 10.

The connecting-shaft bearing 52 is formed by an orifice made in an intermediate section 54 of the arm 42. The orifice is delimited by a closed internal cylindrical wall 56 with a main axis "B" that is in this case transverse.

In a variant of the invention that is not shown, the connecting-shaft bearing is open radially with an opening large enough to enable the transmission shaft to be inserted longitudinally. The opening is then designed to be closed by an attached cap.

The main axis "A" of the suspension ring 48 is in this case parallel with the main axis "B" of the connecting-shaft bearing 52.

The intermediate section 54 is interposed longitudinally between the mount 44 and a longitudinal end section that includes the suspension ring 48.

As shown in particular in FIG. 2, the connecting-shaft bearing 52 is arranged longitudinally closer to the mount 44 than to the suspension ring 48.

Furthermore, in order to act as a motor support, the support device 40 must have a very high rigidity. The support device 40 must notably have high flexural rigidity in a longitudinal vertical plane. The presence of the connecting-shaft bearing 52 tends to reduce the flexural rigidity and/or the tensile strength of this part. To overcome this problem, the invention proposes arranging stiffening ribs 58A, 58B on the arm 42. The support device 40 in this case has two ribs 58A, 58B that lie in a plane orthogonal to the axis "A" of the suspension ring 48, in this case in a longitudinal vertical plane. An upper rib 58A links the intermediate section 54 to the fastening mount 44, passing above the connecting-shaft bearing 52. Equally, a lower rib 58B links the intermediate section 54 to the fastening mount 44, passing beneath the connecting-shaft bearing 52.

FIGS. 3 and 4 show the support device 40 incorporating the connecting-shaft bearing 52 mounted on the powerplant 10.

The powerplant 10 in this case has several motor supports 36 that act exclusively as motor supports, and a support device 40 made according to the teachings of the invention incorporating the connecting-shaft bearing 52.

The suspension ring 48 of the support device 40 is in this case fitted with the damping member 50, which is formed by a concentric assembly of two rings made of elastomer material separated radially by metal sheet rings. The damping member 50 has an orifice at the center that is designed to be fitted onto a corresponding contact of the support element.

The fastening mount 44 for the support device 40 is in this case pressed against a vertical transverse wall 60 of the motor 12. The mount 44 is in this case attached using three fastening screws 61 passed through the orifices 46 and screwed into corresponding internal threads in the wall 60 of the motor 12.

The long transmission shaft 22 is arranged along said wall 60, and a longitudinal space is reserved between the transmission shaft 22 and the wall 60 to enable the shaft to rotate. During assembly, a guide bearing (not shown) is mounted about the long transmission shaft 22. Subsequently, the long transmission shaft 22 is inserted transversely in the connecting-shaft bearing 52 towards the differential of the gearbox 14, until the guide bearing is seated in the connecting-shaft bearing 52. As shown in FIG. 2, the inner wall 56 of the connecting-shaft bearing 52 has an annular shoulder 62 against which an outer ring of the guide bearing is designed to stop transversely.

An annular cover 64 is then fastened by screwing to the arm 42 of the support device 40 to close the connecting-shaft bearing 52, thereby preventing the guide bearing from coming out.

Furthermore, an accessory, in this case the charger 13, is carried partially by the upper rib 58A of the support device 40. For this purpose, a support lug 66 of the charger 13 extends vertically downwards from the charger 13 to a lower end that bears against the upper rib 58A, above the mount 44.

The support device 40 combines the functions of motor support, connecting-shaft bearing and, without limitation, accessory support in a single part. This helps to facilitate assembly of the powerplant 10 compared to an arrangement involving a different part for each of these functions.

Furthermore, the support device 40 helps to reduce the space occupied in the motor compartment by reducing the number of parts.

Furthermore, the support device 40 also enables a contact of the structural element to be arranged to face the transmission shaft. This helps to increase design freedom.

The invention claimed is:

1. A monobloc device for supporting a motor vehicle powerplant comprising:
   a support arm,
   a fastening mount that is arranged at a first end of the support arm and that is configured to be rigidly attached to the powerplant along an inclined plane, and
   a suspension ring with a given main axis that is arranged at a second end of the support arm and that is configured to be attached to a structural element of the vehicle with an interposed damping ring, and
   a connecting-shaft bearing that is configured to support a transmission shaft of the powerplant passing therethrough,
   wherein the arm, the mount and the ring are made as a single part, and wherein the connecting-shaft bearing is formed in an intermediate section of the arm,
   the fastening mount extending upwards along the inclined plane and forming an acute angle with a line extending downwards and joining the connecting-shaft bearing and the main axis of the suspension ring.

2. The device as claimed in claim 1, wherein the connecting-shaft bearing is formed in an intermediate section of the arm positioned between the mount and the suspension ring.

3. The device as claimed in claim 1, wherein the connecting-shaft bearing is arranged closer to the mount than to the suspension ring.

4. The device as claimed in claim 1, wherein the connecting-shaft bearing is formed by an orifice delimited by a closed annular wall with a given main axis.

5. The device as claimed in claim 1, wherein the main axis of the suspension ring is parallel with a main axis of the connecting-shaft bearing.

6. The device as claimed in claim 1, wherein the arm has stiffening ribs in a plane orthogonal to the axis of the suspension ring that link the intermediate section and the fastening mount.

7. A motor vehicle fitted with a powerplant including an electric motor, wherein the powerplant is attached to a structural element of the vehicle by at least one device as claimed in claim 1.

\* \* \* \* \*